No. 661,677. Patented Nov. 13, 1900.
S. TAYLOR.
SUPPORT OR HOLDER FOR WHEELS OR LIGHT VEHICLES.
(Application filed May 14, 1900.)
(No Model.)
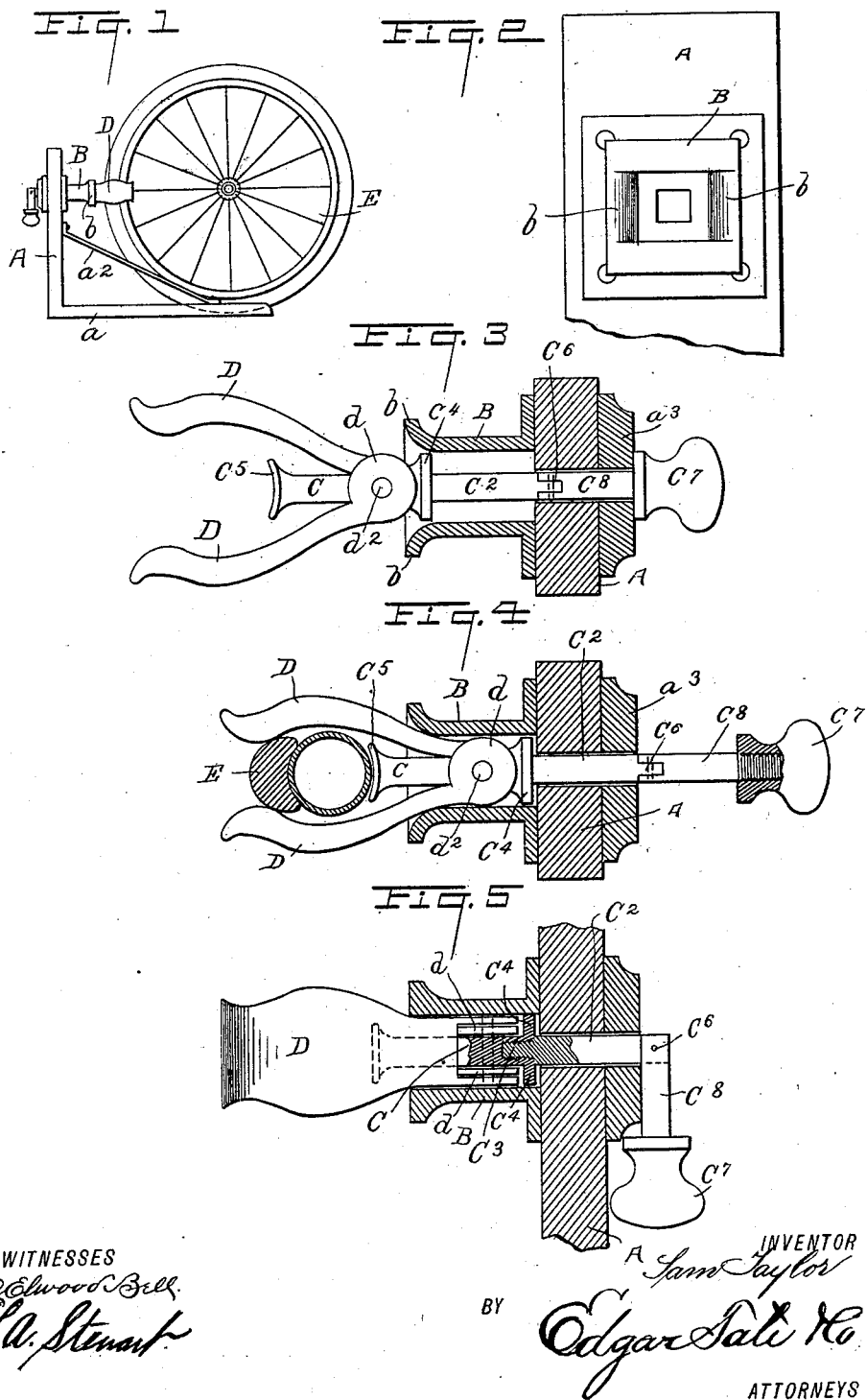

UNITED STATES PATENT OFFICE.

SAM TAYLOR, OF CLAYTON, MASSACHUSETTS.

SUPPORT OR HOLDER FOR WHEELS OR LIGHT VEHICLES.

SPECIFICATION forming part of Letters Patent No. 661,677, dated November 13, 1900.

Application filed May 14, 1900. Serial No. 16,587. (No model.)

*To all whom it may concern:*

Be it known that I, SAM TAYLOR, a citizen of the United States, residing at Clayton, in the county of Berkshire and State of Massachusetts, have invented certain new and useful Improvements in Supports or Holders for Wheels or Light Vehicles, of which the following is a full and complete specification, such as will enable those skilled in the art to which it appertains to make and use the same.

This invention relates to supports or holders for wheels, bicycles, and other light vehicles of this class; and the object thereof is to provide an improved device for this purpose which is simple in construction and operation and which is portable and may be placed wherever such a device is required.

The invention is fully disclosed in the following specification, of which the accompanying drawings form a part, in which the separate parts of my improvement are designated by the same reference characters in each of the views, and in which—

Figure 1 is a side elevation of my improvement, showing a wheel supported thereby; Fig. 2, a front view of the upright portion of the device with the movable parts removed; Fig. 3, a sectional plan view of the apparatus as shown in Fig. 1, but showing the parts in a different position; Fig. 4, a view similar to Fig. 3, showing the method of the operation of the device; and Fig. 5, a sectional side view showing the parts in a position different from that shown in Figs. 3 and 4.

In the practice of my invention I provide a device for the purpose specified which preferably comprises an upright or standard A, provided with any suitable base $a$, which is also preferably connected with the upright A by a brace $a^2$, and secured to the upper portion of the upright A is a casing B, which is preferably rectangular in cross-section, and the outer-end side walls of which are flared outwardly, as shown at $b$.

Mounted in the casing B and adapted to slide therein is a member C, having a shank $C^2$, which, as shown in the drawings, is formed independently of and secured to the member C, as shown at $C^3$ in Fig. 5, and the member C is provided at its inner end with a head $C^4$ and at its outer end with a head $C^5$. The shank $C^2$ of the member C passes through the upright A and preferably through a plate $a^3$, secured thereto, and said shank $C^2$ is composed of two parts, the outer section or member $C^8$ thereof being hinged thereto, as shown at $C^6$, and provided with a knob or handle $C^7$. Pivotally connected with the inner end of the member C are two similar clamp-jaws D, each of which is provided at its inner end with two similar jaws $d$, which inclose the inner end of the member C and are pivotally connected therewith, as shown at $d^2$, and the clamping-jaws D in the operation of the device are designed to clamp and hold the rim and tire of a wheel, as shown in Figs. 1 and 4, and in Fig. 1 I have shown a wheel E held in position by my improved support, and in Fig. 4 I have shown a section of the tire and rim of this wheel.

The operation will be readily understood from the foregoing description when taken in connection with the accompanying drawings and the following statement thereof.

It will be seen that the member $C^8$ of the shank $C^2$, together with the knob or handle $C^7$, is adapted to swing vertically when the sliding member C is in its innermost position in the casing B, and when the device is to be used the knob or handle $C^7$ is raised into a horizontal position and shoved inwardly, as shown in Fig. 3. This operation forces the clamping-jaws outwardly, as shown in said figure, when a wheel may be inserted between said jaws, as shown in Fig. 1. In this operation the tire of the wheel strikes the head $C^5$ of the sliding member C and forces said member back into the position shown in Fig. 4, and in this operation the clamping-jaws are forced inwardly by the sides $b$ of the casing B and caused to securely grasp and hold the rim and tire of a wheel, and at the same time the knob or handle $C^7$ drops downwardly into the position shown in Fig. 5. In order to release the wheel, all that is necessary is to raise the knob or handle and force the sliding member C outwardly into the position shown in Fig. 3. This device is simple in construction and operation and perfectly adapted to accomplish the result for which it is intended and may be used in connection with a single wheel for exhibition purposes or to support a bicycle for the same or other purposes.

Having fully described my invention, I claim as new and desire to secure by Letters Patent—

1. A device of the class described, comprising an upright provided at one side with a hollow casing, the end walls of which are beveled outwardly at the sides thereof, a sliding member mounted in said casing and provided with a shank which passes through the upright, said sliding member being also provided with two jaws which are pivotally connected with the inner end thereof, and being also provided at its outer end with a head, and the shank of said sliding member being provided with a hinged member having a knob or handle, substantially as shown and described.

2. A device of the class described, comprising an upright support, a hollow casing secured to one side thereof, a sliding member mounted in said casing and provided at its inner end with a shank which passes loosely through the support, and jaws pivotally connected with said sliding member near its inner end and which project outwardly through said casing, said jaws being adapted to be forced out of said casing by said shank, substantially as shown and described.

3. A device of the class described, comprising an upright support, a hollow casing secured to one side thereof, a sliding member mounted in said casing and provided at its inner end with a shank which passes through the support, and jaws pivotally connected with said sliding member near its inner end and which project outwardly through said casing, said sliding member being also provided at its outer end with a head, and the shank of said sliding member being provided with a hinged section, substantially as shown and described.

4. In a device of the class described, a hollow casing which is adapted at one end to be secured to a suitable support, and the other end of which is open, a sliding member mounted in said casing and provided at its inner end with a shank which is adapted to be passed through said support, and jaws pivotally connected with said sliding member, and adapted to project from the open end of said casing, said sliding member being also provided with a head which projects outwardly from the pivotal connection of said jaws, substantially as shown and described.

5. In a device of the class described, a hollow casing which is adapted at one end to be secured to a suitable support, and the other end of which is open, a sliding member mounted in said casing and provided at its inner end with a shank which is adapted to be passed through said support, and jaws pivotally connected with said sliding member, and adapted to project from the open end of said casing, said sliding member being also provided with a head which projects outwardly from the pivotal connection of said jaws, and the shank of said sliding member being provided with a hinged section having a knob or handle, substantially as shown and described.

In testimony that I claim the foregoing as my invention I have signed my name, in presence of the subscribing witnesses, this 10th day of May, 1900.

SAM TAYLOR.

Witnesses:
HENRY GEORGE ROBINSON,
DANIEL W. MANVEL.